May 2, 1950 R. R. L. GEFFROY 2,505,957
DRY LIME ACETYLENE GENERATOR
Filed May 8, 1945
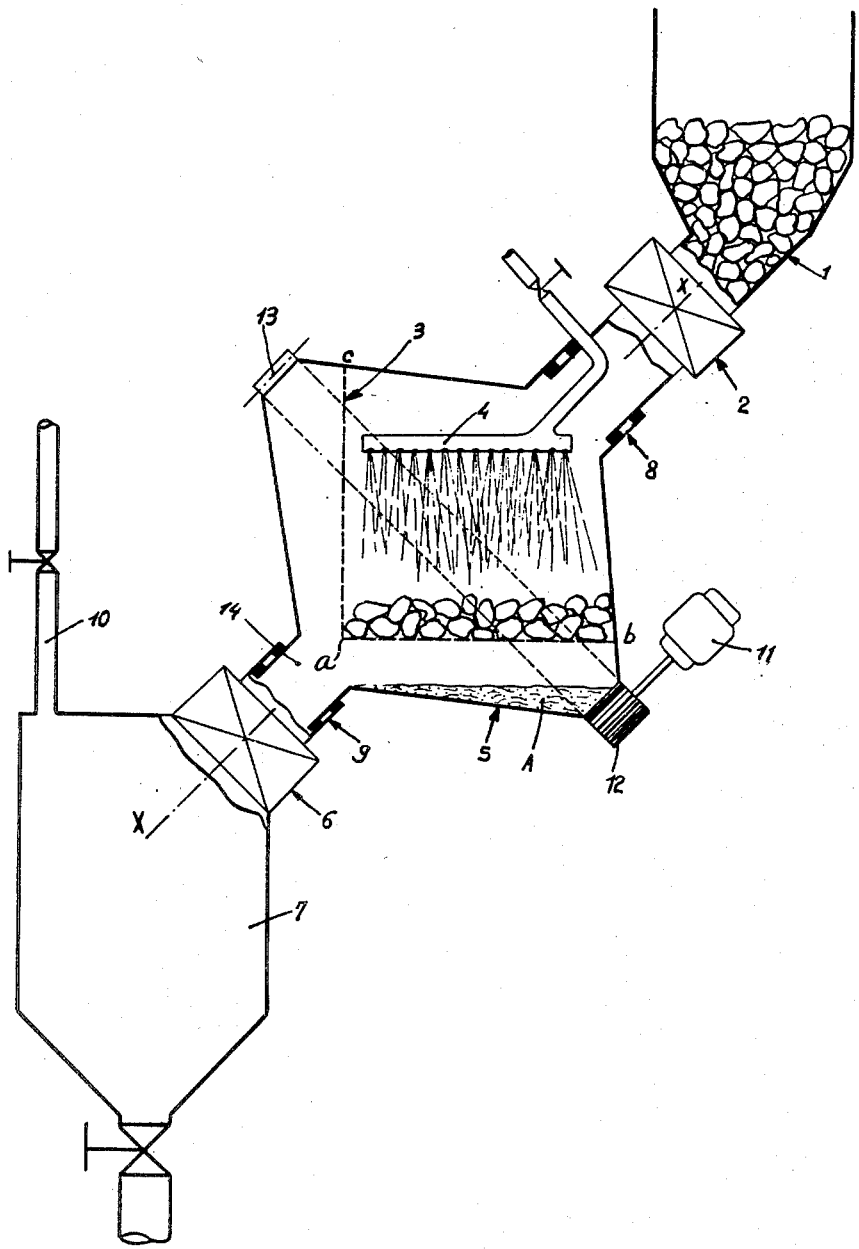
INVENTOR
Robert René Louis Geffroy
By Otto Munk
his ATTY.

Patented May 2, 1950

2,505,957

UNITED STATES PATENT OFFICE 2,505,957

DRY LIME ACETYLENE GENERATOR

Robert René Louis Geffroy, Neuilly-sur-Seine, France, assignor to Volcan S. A., Levallois (Seine), France Application May 8, 1945, Serial No. 592,617
In France January 19, 1944

Section 1, Public Law 690, August 8, 1946
Patent expires January 19, 1964

8 Claims. (Cl. 48—33)

The invention relates to acetylene generators in which the calcium carbide, contained in a rotating openwork basket, is sprinkled with just enough water to provoke the reaction producing the acetylene and to keep constant the temperature of the apparatus by evaporation, in such a way that the lime obtained remains in a powdered state, which affords the well-known advantages.

These generators have the following drawback: fragments of non-attacked carbide fall from the basket together with the lime. Besides the resulting diminution of the efficiency, these carbide fragments absorb the moisture of the lime, in the midst of which they are embedded. The ensuing reaction causes an intense and very local heating, on account of the low thermal conductivity of the lime, the temperature being sometimes such that self-ignition occurs when emptying the lime collecting receptacle.

It is an object of this invention to provide an apparatus of simple, strong and cheap construction of small overall dimension, affording a complementary stirring of the non-attacked carbide particles with the still moistened lime, in order to achieve decomposition of the carbide and to avoid local overheating.

It is a further object of the invention to provide a dry lime acetylene-gas generator which may be operated continuously for long periods without shutdown for introducing a fresh supply of carbide and which includes a rotatable generating chamber into which fresh carbide may be fed during rotation of the chamber and from which hydrated lime may be continuously or intermittently withdrawn to a storage bin or other point of disposal.

The apparatus according to the invention comprises a biconical rotary carbide basket of inclined axis, combined with a rotary lime collecting receptacle of similar shape, adapted to stir the lime and the carbide fragments escaped from the basket; the above mentioned disposition providing for an easy feeding of the carbide into the basket and for an easy discharge of the lime from the collecting receptacle.

The invention is also concerned with a complete apparatus, including the above mentioned devices, combined with means for affording continuous and automatic running.

Reference is made to the applicant's copending application Serial No. 592,615, filed May 8, 1945, entitled, Dry lime acetylene generators, which shows and claims subject matter related to that of the present application.

Further features of the invention will be disclosed in the following description, referring to the appended drawing, which shows, by way of example, an embodiment of the invention, and wherein is shown a diagrammatic sectional view of an apparatus according to the invention.

In the example shown in the drawing, the generator comprises a fixed carbide hopper 1, a distributor 2 and a rotary openwork basket 3 of a generally biconical shape, i. e., made up of two cones or frustums joined by their large bases (or a similar shape of revolution), the axis X—X of which is properly inclined in order to form at the lower part a substantially horizontal floor $ab$, which as the basket is rotated rises progressively to form a substantially vertical wall $ac$, a perforated water distributing pipe 4, a dry lime collector 5, a cut off device 6, a dry lime hopper 7, gas-tight joints 8 and 9 between the fixed and rotary parts and an acetylene outlet pipe 10.

According to the invention, the shape of the dry lime collector 5 is similar to that of basket 3 and is rotatable with the latter around axis X—X, the whole being actuated by a motor 11, through a pinion 12 in mesh with a toothed crown 13, secured to collector 5.

The carbide fragments sieving through basket 3 and collected with the lime at A, at the lower part of receptacle 5, are stirred with the lime by the rotation of collector 5 and are prevented from escaping through outlet 14, at the lower apex of the cone, before complete conversion into lime, thus eliminating all risks of local overheating.

The device shown in the drawing is perfectly adapted to a continuous and automatic running. For this purpose, distributor 2 (of any known type) is preferably controlled by motor 11 by means of an electric relay, or by a dynamometric or other device, in order to start feeding when the torque of the motor falls below a certain limit, while feeding is interrupted when the torque exceeds a certain limit, these limits being more or less apart from each other.

The invention is obviously not limited to the above mentioned details of construction, which have been given only by way of example.

Having now described my invention what I claim as new and desire to secure by Letters Patent is:

1. In a dry lime acetylene gas-generator, a rotary substantially biconical casing, a rotary substantially biconical carbide container having an openwork lower portion, the common axis of said casing and container being arranged obliquely to the vertical, means for rotating said casing and container about their common axis, means for feeding carbide into said container though the upper apex thereof, means extending through the apices of said casing and container for spraying water onto the carbide in said container, and means for discharging lime from said casing.

2. In a dry lime acetylene gas-generator, a rotary substantially biconical casing, a rotary substantially biconical carbide container having an openwork lower portion, said casing and said container being rotatable on a common axis arranged obliquely to the vertical, means for rotating said casing and container about their common axis, means for feeding carbide into said container through the upper apex thereof, means extending through the apices of said casing and container for spraying water onto the carbide in said container, a fixed receptacle adjacent the lower apex of said casing, means defining a sealed conduit connection between said casing and said receptacle for discharge of lime from the casing to said receptacle and means for withdrawing lime from said fixed receptacle.

3. A generator as claimed in claim 1, wherein said lime discharging means extend through the lower apex of said casing.

4. A generator as claimed in claim 1, wherein the upper solid walls of said container are common with the upper walls of said casing.

5. A dry lime acetylene gas generator as claimed in claim 1, wherein the axis of rotation substantially coincides with the geometrical axis about which the cones representing said biconical casing are generated and the generatrix of the lower of said cones on the lower side thereof lies in a substantially horizontal plane.

6. A dry lime acetylene gas generator as claimed in claim 1, wherein the axis of rotation of the biconical carbide container is inclined to the horizontal at an angle substantially equal to 45° and wherein the axis of rotation substantially coincides with the geometrical axis about which the walls of the biconical container are generated and the generatrix of the cone representing the lower conical wall portion lies in a substantially horizontal plane.

7. In a dry lime acetylene generator, a casing mounted for rotation about an axis inclined to the vertical, a carbide container mounted within said casing for rotation therewith about said axis, said container and said casing having spaced conical wall portions with their apices disposed toward the lower end of said axis, said conical wall portion of the container having an apex angle so related to the angle of inclination of said axis that it revolves about the axis in a path which on the lower side of said axis coincides with a substantially horizontal plane, whereby lime passing through said openwork wall portion is deposited in a thin, evenly extended layer on the adjacent wall portion of the casing, means for rotating the casing and container about said axis, means for feeding carbide by gravity into said container through an opening in the end thereof extending toward the upper end of the axis, means extending into said casing and container through said opening for spraying water over the carbide in the container, and means for discharging lime from the casing including a discharge opening adjacent said apex of the conical wall portion of the container, so that lime is discharged by gravity through said opening as said casing is rotated.

8. In a dry lime acetylene generator, a casing mounted for rotation about an axis inclined to the vertical, a carbide container mounted within said casing for rotation therewith about said axis, said container and said casing having spaced substantially parallel conical wall portions with their apices disposed toward the lower end of said axis, said conical wall portions having apex angles so related to the angle of inclination of said axis that they revolve about the axis in paths which on the lower side of said axis coincide with substantially horizontal planes, whereby lime passing through said openwork wall portion is deposited in a thin, evenly extended layer on the adjacent wall portion of the casing, means for rotating the casing and container about said axis, means for feeding carbide by gravity into said container through an opening in the end thereof extending toward the upper end of the axis, means extending into said casing and container through said opening for spraying water over the carbide in the container, and means for discharging lime from the casing including a discharge opening in the end thereof extending toward the lower end of said axis, so that lime is discharged by gravity through said opening as said casing is rotated.

ROBERT RENÉ LOUIS GEFFROY.

REFERENCES CITED

The following references are of record in the file of this patent:

UNITED STATES PATENTS

| Number | Name | Date |
| --- | --- | --- |
| 604,140 | Dolan | May 17, 1898 |
| 1,712,674 | Mujica | May 14, 1929 |
| 1,872,741 | Jane | Aug. 23, 1932 |
| 2,204,184 | Kojola et al. | June 11, 1940 |
| 2,290,036 | Davis | July 14, 1942 |
| 2,343,185 | Hohm et al. | Feb. 29, 1944 |
| 2,357,186 | Gfeller | Aug. 29, 1944 |